(12) United States Patent
Mooney et al.

(10) Patent No.: US 9,791,905 B2
(45) Date of Patent: Oct. 17, 2017

(54) RATE SCALABLE IO INTERFACE WITH ZERO STAND-BY POWER AND FAST START-UP

(75) Inventors: Stephen R. Mooney, Mapleton, UT (US); Howard L. Heck, Hillsboro, OR (US); James E. Jaussi, Hillsboro, OR (US); Bryan K. Casper, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 177 days.

(21) Appl. No.: 13/995,596

(22) PCT Filed: Oct. 28, 2011

(86) PCT No.: PCT/US2011/058194
§ 371 (c)(1),
(2), (4) Date: Mar. 31, 2014

(87) PCT Pub. No.: WO2013/062565
PCT Pub. Date: May 2, 2013

(65) Prior Publication Data
US 2014/0208126 A1    Jul. 24, 2014

(51) Int. Cl.
*G06F 1/00*    (2006.01)
*G06F 1/26*    (2006.01)
(Continued)

(52) U.S. Cl.
CPC ............... *G06F 1/26* (2013.01); *G06F 1/266* (2013.01); *G06F 1/324* (2013.01); *G06F 1/3215* (2013.01);
(Continued)

(58) Field of Classification Search
CPC ................................ G06F 1/26; G06F 1/266
(Continued)

(56) References Cited

U.S. PATENT DOCUMENTS 6,438,462 B1 *  8/2002  Hanf ..................... G06F 1/3203
                                                340/693.4
6,839,778 B1    1/2005  Sartore et al.
(Continued)

FOREIGN PATENT DOCUMENTS

| TW | I224255 B | 11/2004 |
| TW | 200737460 A | 10/2007 |
| WO | 2013/062565 A1 | 5/2013 |

OTHER PUBLICATIONS

International Preliminary Report on Patentability and Written Opinion received for PCT Patent Application No. PCT/US2011/058194, mailed on May 8, 2014, 12 pages.
(Continued)

*Primary Examiner* — Robert Cassity
(74) *Attorney, Agent, or Firm* — Jordan IP Law, LLC

(57) ABSTRACT

Systems and methods of interconnecting devices may include an input/output (IO) interface having one or more clock circuits, a power supply coupled to the one or more clock circuits, and logic to receive a rate adjustment command at the IO interface. The logic may also be configured to adjust a data rate of the IO interface in response to the rate adjustment command, and to adjust an output voltage of the power supply in response to the rate adjustment command.

34 Claims, 4 Drawing Sheets

(51) Int. Cl.
*G06F 13/14* (2006.01)
*G06F 1/32* (2006.01)
*G09G 5/00* (2006.01)
*G09G 5/18* (2006.01)

(52) U.S. Cl.
CPC .......... *G06F 1/3265* (2013.01); *G06F 1/3278* (2013.01); *G06F 1/3296* (2013.01); *G06F 13/14* (2013.01); *G09G 5/006* (2013.01); *G09G 5/18* (2013.01); *G09G 2330/021* (2013.01); *Y02B 60/126* (2013.01); *Y02B 60/1217* (2013.01); *Y02B 60/1242* (2013.01); *Y02B 60/1285* (2013.01); *Y02B 60/32* (2013.01)

(58) Field of Classification Search
USPC ........................................................ 713/300
See application file for complete search history.

(56) References Cited

U.S. PATENT DOCUMENTS

| 2002/0108070 | A1  | 8/2002  | Oh |  |
|---|---|---|---|---|
| 2003/0070103 | A1  | 4/2003  | Kim |  |
| 2003/0079149 | A1* | 4/2003  | Edwin | G06F 1/3203 |
|  |  |  |  | 713/300 |
| 2004/0215986 | A1* | 10/2004 | Shakkarwar | G06F 1/3296 |
|  |  |  |  | 713/300 |
| 2005/0159905 | A1* | 7/2005  | Bond | G01F 15/063 |
|  |  |  |  | 702/51 |
| 2005/0289621 | A1  | 12/2005 | Mungula |  |
| 2006/0149977 | A1* | 7/2006  | Cooper | G06F 1/3215 |
|  |  |  |  | 713/300 |
| 2007/0220184 | A1* | 9/2007  | Tierno | G06F 5/12 |
|  |  |  |  | 710/52 |
| 2009/0148155 | A1  | 6/2009  | Latchman |  |
| 2010/0257398 | A1  | 10/2010 | Alexander et al. |  |
| 2011/0148372 | A1* | 6/2011  | Mariani | H02M 3/156 |
|  |  |  |  | 323/272 |
| 2012/0290885 | A1* | 11/2012 | Mobin | H04L 7/0337 |
|  |  |  |  | 714/56 |

OTHER PUBLICATIONS

Office Action received for Taiwanese Patent Application No. 101135824, mailed on Jul. 17, 2014, 6 pages of English Translation and 8 pages of Office Action.

International Search Report and Written Opinion received for PCT Application No. PCT/US2011/058194, mailed on May 24, 2012, 10 pages.

* cited by examiner

RATE SCALABLE IO INTERFACE WITH ZERO STAND-BY POWER AND FAST START-UP

GOVERNMENT INTEREST STATEMENT

This invention was made with Government support under HR0011-10-3-0007 awarded by the Department of Defense. The Government has certain rights in this invention.

BACKGROUND

Technical Field

Embodiments generally relate to input/output (IO) interfaces. More particularly, embodiments relate to an IO connector configuration that has an adjustable data rate and enhanced power conservation.

Discussion

Computing systems may include one or more USB (Universal Serial Bus, e.g., USB Specification 2.0, USB Implementers Forum) ports to support IO communication with peripheral components such as keyboards, mice, cameras, and so forth. A typical USB port may be limited, however, to operation at a single data rate. Even if a lower data rate may be supported for backward compatibility, the power supply to the interface components containing the signaling circuits may remain at the nominal level required for higher speed operation. Accordingly, optimum power consumption in the interface might not be achievable for lower speed modes of operation.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may include an input/output (IO) interface having a datapath section with one or more clock circuits, a power supply coupled to the one or more clock circuits, and logic. The logic may be configured to receive a rate adjustment command at the IO interface, adjust a data rate of the IO interface in response to the rate adjustment command, and adjust an output voltage of the power supply in response to the rate adjustment command.

Embodiments may also include a host platform having a power supply, a host device to issue a rate adjustment command, and an IO interface with one or more datapath section clock circuits coupled to the power supply, and logic. The logic can be configured to receive the rate adjustment command at the IO interface, adjust a data rate of the IO interface in response to the rate adjustment command, and adjust an output voltage of the power supply in response to the rate adjustment command.

Other embodiments can involve a computer implemented method in which a rate adjustment command is received at an IO interface. The method may provide for adjusting a data rate of the IO interface in response to the rate adjustment command, and adjusting an output voltage of a power supply associated with one or more clock circuits of the IO interface in response to the rate adjustment command.

Additionally, embodiments may include a computer readable storage medium having a set of instructions which, if executed by a processor, cause an IO interface to receive a rate adjustment command at the IO interface. The instructions may also cause the IO interface to adjust a data rate of the IO interface in response to the rate adjustment command, and adjust an output voltage of a power supply associated with one or more clock circuits of the IO interface in response to the rate adjustment command.

Figure 1:
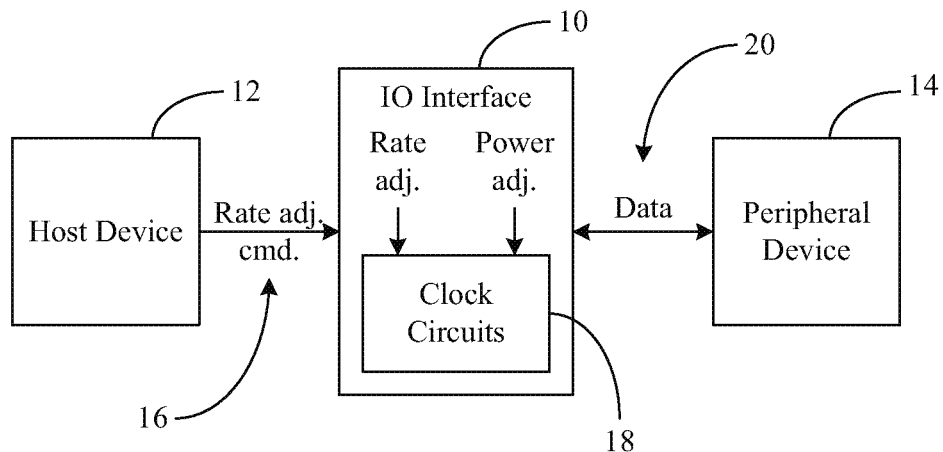
FIG. 1 is a block diagram of an example of a scheme of adjusting data rates in an input/output (IO) interface according to an embodiment.

Turning now to FIG. 1, an IO interface 10 between a host device 12 and a peripheral device 14 is shown. The host device 12 might include a chipset component such as a processor and/or platform controller hub (PCH) of a personal digital assistant (PDA), mobile Internet device (MID), wireless smart phone, media player, imaging device, smart tablet, desktop personal computer (PC), server, etc., or any combination thereof. In addition, the peripheral device 14 could include, for example, a keyboard, mouse, camera, PDA, MID, wireless smart phone, media player, imaging device, smart tablet, etc., or any combination thereof. In the illustrated example, the host device 12 issues a rate adjustment command 16, which is received by the IO interface 10. The IO interface 10 may incorporate, for example, USB technology, DisplayPort (DP, e.g., Embedded DisplayPort Standard (eDP) Version 1.3, January 2011, Video Electronics Standards Association) technology, High-Definition Multimedia Interface (HDMI, e.g., HDMI Specification, Ver. 1.3a, Nov. 10, 2006, HDMI Licensing, LLC) technology, Thunderbolt (e.g., Thunderbolt™ Technology: The Transformational PC I/O, 2011, Intel Corporation) technology, Peripheral Components Interconnect Express (PCI-e, e.g., PCI Express x16 Graphics 150W-ATX Specification 1.0, PCI Special Interest Group) technology, and so forth.

The IO interface 10 may include one or more clock circuits 18 that are used to transfer data 20 between the peripheral device 14 and the platform containing the host device 12. As will be discussed in greater detail, the clock circuits 18 might include one or more phase locked loop (PLL) modules, clock and data recovery (CDR) modules, and so forth. In response to the rate adjustment command 16, the illustrated IO interface 10 adjusts the frequency of the clock circuits 18 (e.g., adjusts the data rate) and adjusts an output voltage of a power supply coupled to the clock circuits 18 and other IO signaling circuits (not shown) in the link. As will be discussed in greater detail, adjusting the data rate of the IO interface 10 enables the IO interface 10 to achieve scalable bandwidth. For example, the IO interface 10 may dynamically adapt itself to support high bandwidth when needed and scale back bandwidth support when data throughput is relatively low. Moreover, adjusting the power supplied to the clock circuits 18 in response to the rate adjustment command 16 enables the IO interface 10 to achieve significant power savings (e.g., voltage squared savings). Indeed, adjusting the power supplied to all IO signaling circuits (e.g., transmitters, receivers, coders, decoders, modulators, demodulators, etc.) may provide the best power/performance trade-off.

Figure 2:
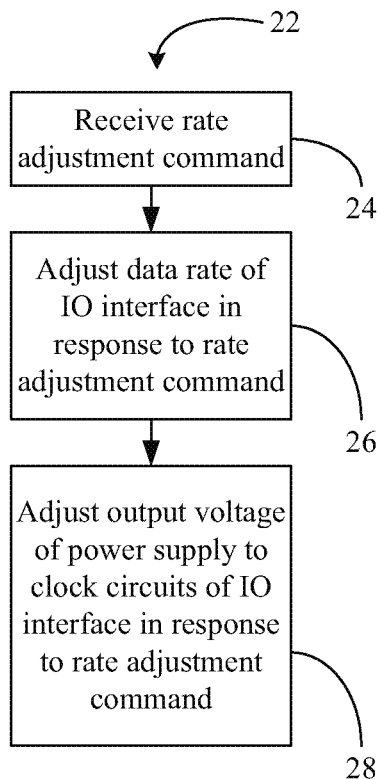
FIG. 2 is a flowchart of an example of a method of adjusting data rates in an IO interface according to an embodiment.

FIG. 2 shows a method 22 of adjusting data rates in an IO interface. The method 22 may be implemented as a set of logic instructions stored in a machine- or computer-readable storage medium such as random access memory (RAM), read only memory (ROM), programmable ROM (PROM), flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), CMOS or transistor-transistor logic (TTL) technology, or any combination thereof. For example, computer program code to carry out operations shown in the method 22 may be written in any combination of one or more programming languages, including an object oriented programming language such as C++ or the like and conventional procedural programming languages, such as the "C" programming language or similar programming languages. Moreover, the method 22 could be implemented using any of the aforementioned circuit technologies.

Processing block 24 provides for receiving a rate adjustment command. The rate adjustment command could be issued by a host device such as the host device 12 (FIG. 1), or other suitable computing system component and/or user. For example, the rate adjustment command could include an instruction to increase the data rate, decrease the data rate, power down the IO interface, re-start the IO interface, etc., wherein the decision to issue the rate adjustment command may be made based on the dynamic operating state of the platform (e.g., bandwidth requirements, power consumption, battery life), a static condition of the platform (e.g., model/generation information), and/or a combination thereof. Illustrated block 26 adjusts a data rate of the IO interface in response to the rate adjustment command. The corresponding data rate adjustment may be conducted by modifying a frequency of one or more clock circuits such as clock circuits 18 (FIG. 1).

Processing block 28 provides for adjusting an output voltage of a power supply associated with the one or more clock circuits in response to the rate adjustment command. Block 28 may also involve adjusting the power supplied to other IO signaling circuits such as transmitters, receivers, coders, decoders, modulators, demodulators, etc. The voltage adjustment could be made by modifying the output voltage of a voltage regulator residing in a semiconductor package on or near the IO interface connector, on a circuit board (e.g., motherboard) containing the IO interface connector, and so forth. As will be discussed in greater detail, the adjustment could involve deactivating the voltage regulator (e.g., in the case of the rate adjustment command including a power down command/instruction). The ability to dynamically adjust the voltage level of the power supplied to the IO interface clock circuits may provide the ability to achieve a V-squared (voltage squared) trade off in power versus performance. Indeed, deactivating the power supply to the clock circuits may result in zero stand-by power.

Figure 3A:
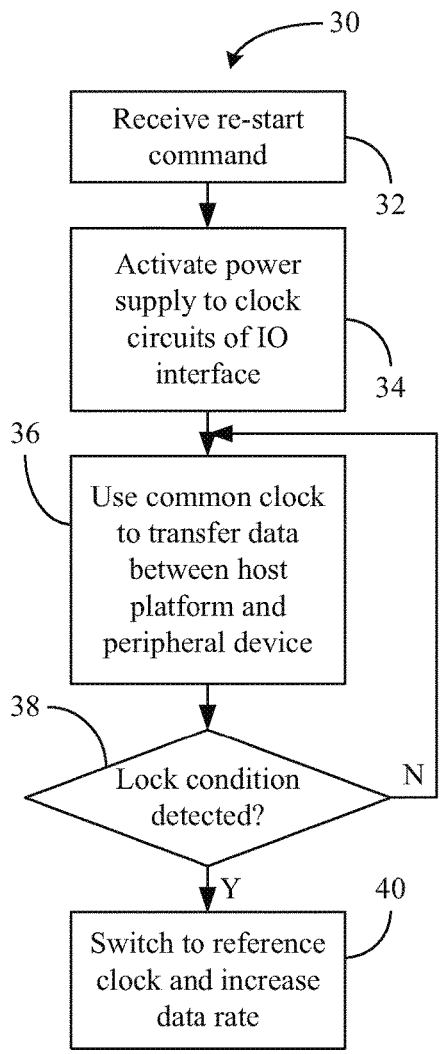
FIGS. 3A and 3B are flowcharts of examples of methods of re-starting an IO interface according to embodiments.
Figure 3B:
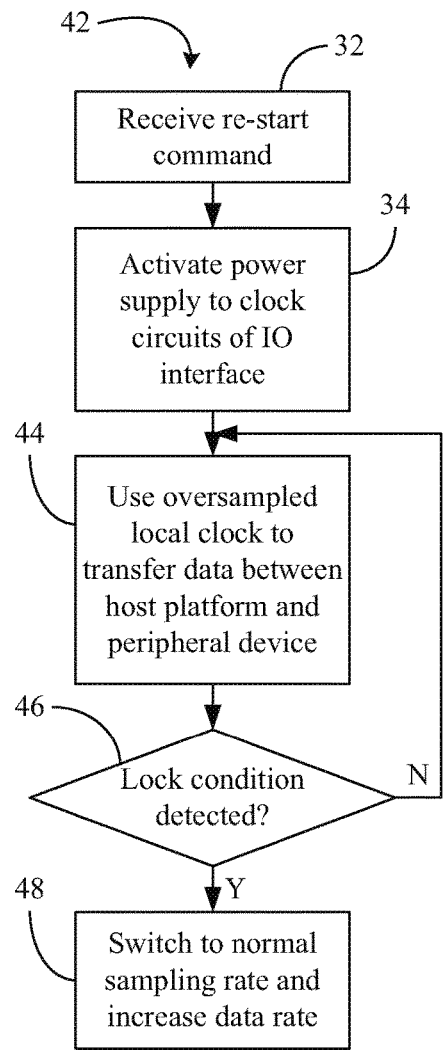

FIGS. 3A and 3B demonstrate varying approaches to re-starting an IO interface, for example, when the host platform has previously powered down the IO interface via a rate adjustment command. In particular, FIG. 3A shows a method 30 in which a re-start command is received at block 32, wherein illustrated block 34 activates a power supply/voltage regulator associated with one or more clock circuits of the IO interface in response to the re-start command. A common clock may be used to transfer data between the host platform and a peripheral device at block 36. The common clock could be a system clock that is distributed to all hosts and devices, or other suitable clock that is available to both the IO interface and the peripheral device (e.g., both sides of the link). Illustrated block 38 provides for determining whether a lock condition has occurred. The lock condition may include a re-locking of one or more control loops of the clock circuits so that synchronized timing and data transfer can be established for the link in question. Thus, the determination at block 38 might involve determining whether a PLL or CDR module of the IO interface can support synchronized data transfer across the link. If the lock condition is not detected, the illustrated approach continues to use the common clock to transfer data between the host platform and the peripheral device.

If the lock condition is detected, block 40 may switch to the standard reference clock of the IO interface and increase the data rate as appropriate. Thus, if the host platform is in a high bandwidth mode of operation (e.g., host device has requested a bandwidth-driven rate increase), block 40 could involve increasing the frequency of the reference clock to a maximum value supported by the IO interface. The rate increase could alternatively be to some intermediate value depending upon the circumstances. Indeed, if a higher data rate has not been requested or is otherwise not appropriate, the rate increase may be bypassed altogether in order to conserve power and/or extend battery life.

FIG. 3B shows an alternative method 42 that might be deployed in plesiochronous environments in which a common clock is not available (e.g., link components use separate clocks that are constrained within specified limits of clock rate variability). In particular, blocks 32 and 34 may provide for receiving a re-start command and activating the power supply to the clock circuits, respectively, as already discussed. Illustrated block 44, on the other hand, uses an oversampled local clock to transfer data between the host platform and the peripheral device until a lock condition is detected at block 46. Thus, the lock condition in the illustrated example might involve a link clock rate variability falling below a certain threshold. Once the lock condition is satisfied, illustrated block 48 switches to the normal sampling rate and increases the data rate of the interface as appropriate. The methods 30, 42 may be implemented as a set of logic instructions stored in a machine- or computer-readable storage medium such as RAM, ROM, PROM, flash memory, etc., in configurable logic such as PLAs, FPGAs, CPLDs, in fixed-functionality logic hardware using circuit technology such as ASIC, CMOS or TTL technology, or any combination thereof.

Figure 4A:
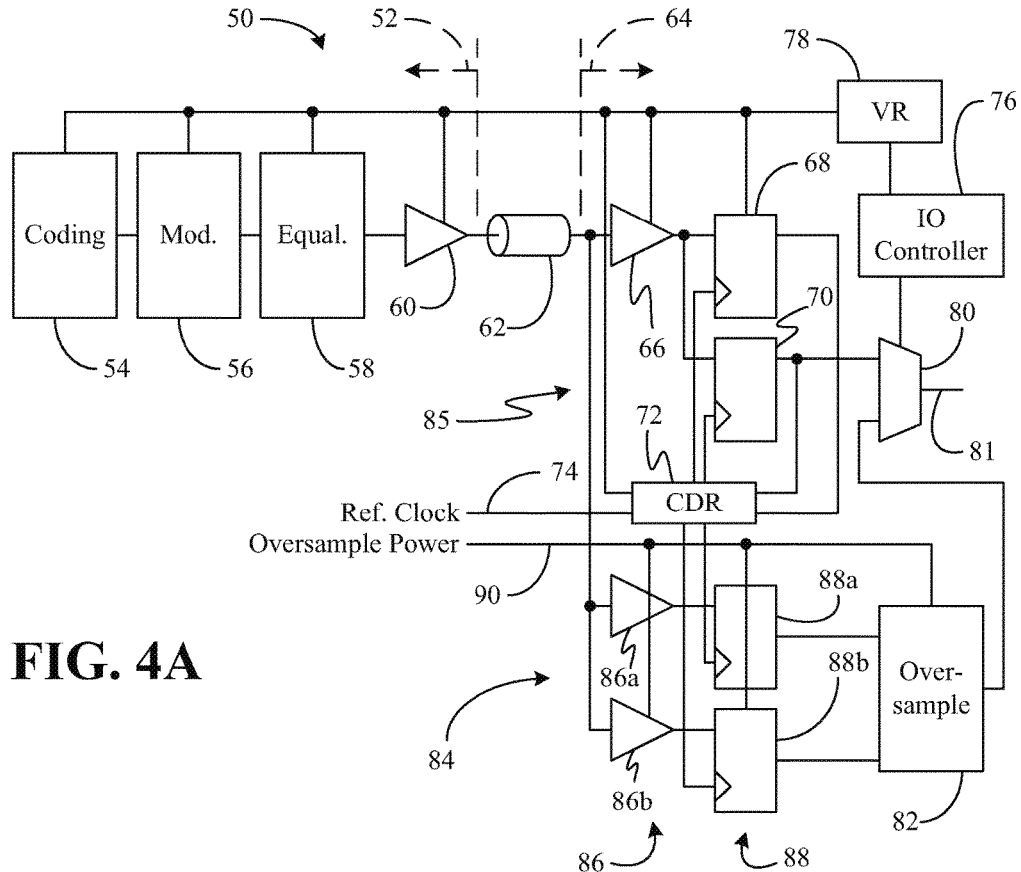
FIGS. 4A and 4B are schematic diagrams of examples of IO links according to embodiments.

Turning now to FIG. 4A, one example of an inbound link 50 is shown for architectures in which oversampling is used to re-start the link 50. In the illustrated example, a peripheral side 52 of the link 50 includes various signal processing components such as a coding unit 54, a modulation unit 56, an equalization unit 58, and a transmit buffer 60 to drive one or more signals onto a link medium such as a cable 62. A host side 64 of the link 50 represents an IO interface such as IO interface 10 (FIG. 1), and may include a datapath section 85 having a receive buffer 66 configured to drive an edge sampling latch 68 as well as a data sampling latch 70. The architecture may also include an outbound link (not shown) having similar components for transferring data from the host side 64 to the peripheral side 52. In addition, a clock and data recovery (CDR) module 72 may provide clock inputs to the latches 68, 70 based on a reference clock 74 and feedback outputs of the latches 68, 70. Thus, the CDR module 72 and latches 68, 70 may constitute a control loop for the datapath section 85. The illustrated approach also includes logic such as an IO controller 76 that sets the frequency of the reference clock 74 as well as the output voltage of a voltage regulator (VR) 78, which may provide power to both sides 52, 64 of the link 50.

If the IO controller 76 receives a request to re-start the link 50, the IO controller may activate the VR 78 and instruct a multiplexer 80 to use the output of an oversampling section 84 of the IO interface until the CDR module 72 achieves an acceptable level of clock rate variability in the datapath section 85 (e.g., lock condition is detected). In particular, the illustrated oversampling section 84 includes a set of receive buffers 86 (86a, 86b) and corresponding latches 88 (88a, 88b), which are powered by a separate power supply 90 for the oversampling section 84. The output of an oversampling (post processing) module 82 may be fed to the multiplexer 80 and used on a selective basis dictated by the IO controller 76. Once the lock condition is detected, the illustrated IO controller 76 may instruct the multiplexer 80 return to use of the output of the datapath section 85 for a data output 81 to the host platform. In addition, the IO controller 76 could then increase the frequency of the reference clock 74 as appropriate. The separate power supply 90 enables the oversampling section 84 to be powered down when not in use.

Figure 4B:
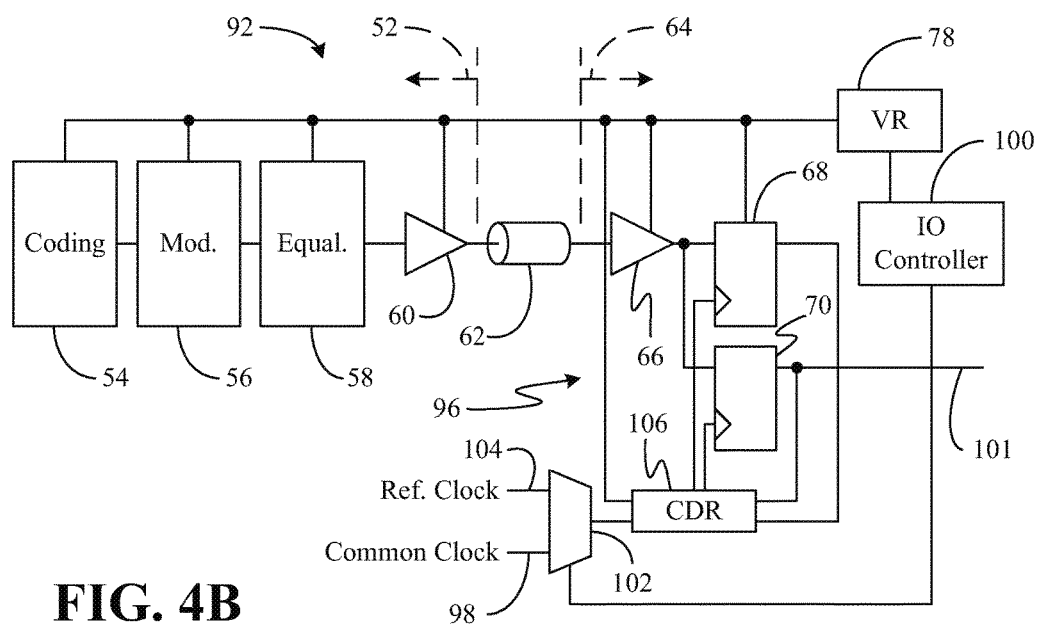

FIG. 4B shows an inbound link 92 in which a host side 94 of the link 92 includes an IO interface with a datapath section 96 that provides a data output 101 based on either a reference clock 104 or a common clock 98. The architecture may also include an outbound link (not shown) having components for transferring data from the host side 94 to the peripheral side 52. In the illustrated example, logic such as an IO controller 100 selects the appropriate clock by providing a signal to a multiplexer 102. Thus, in normal operation, the reference clock 104 may be supplied to a CDR 106, which in turn controls latches 68, 70, as already described. If, on the other hand, the IO interface is powered down and the IO controller 76 receives a re-start command, the illustrated IO controller 100 activates the VR 78 and instructs the multiplexer 102 to use the common clock 98 until the lock condition is detected. Detection of the lock condition may therefore trigger a switch of the multiplexer 102 back to using the reference clock 104. In addition, the IO controller 100 may increase the frequency of the reference clock 104 if, for example, a rate increase request/command has been received.

Figure 5:
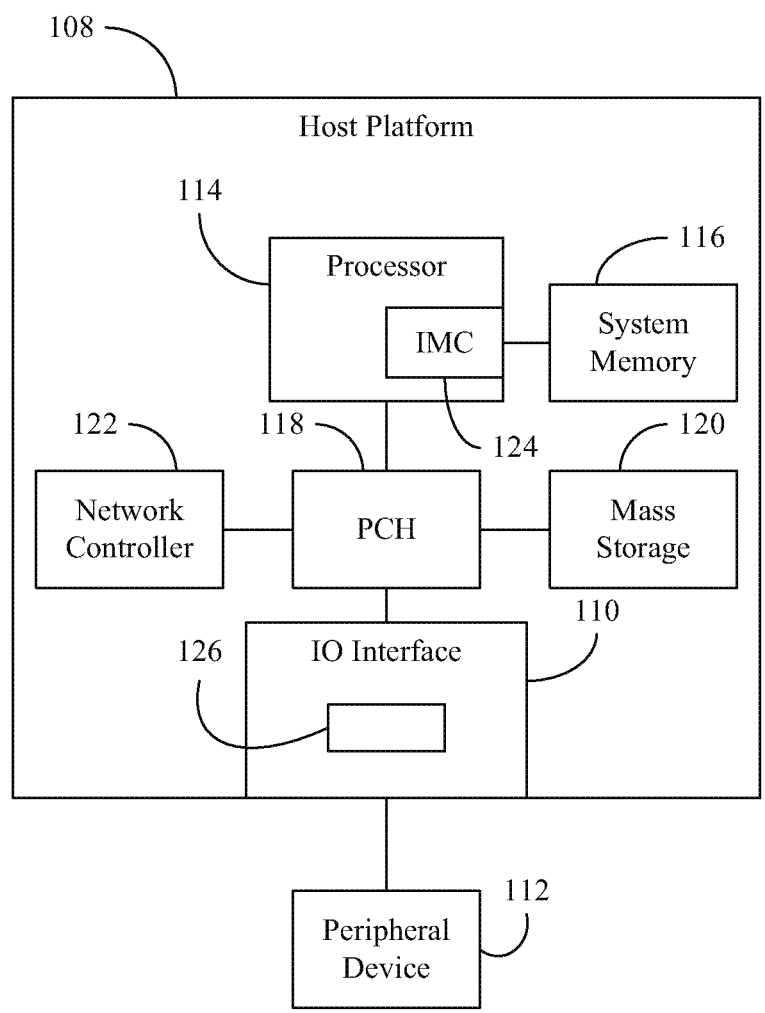
FIG. 5 is a block diagram of an example of a connection between a host platform and a peripheral device according to an embodiment.

Turning now to FIG. 5, a host platform 108 is shown in which an IO interface 110 is used to interconnect the platform 108 with a peripheral device 112. As already noted, the host platform 108 could be part of a mobile device such as a PDA, MID, wireless smart phone, media player, imaging device, smart tablet, etc., or any combination thereof. The host platform 108 could alternatively include a fixed platform such as a desktop PC or a server. In addition, the peripheral device 112 might include a keyboard, mouse, camera, PDA, MID, wireless smart phone, media player, imaging device, smart tablet, etc., or any combination thereof. In the illustrated example, the host platform 108 also has a processor 114, system memory 116, a platform controller hub (PCH) 118, mass storage (e.g., hard disk drive/HDD, optical disk, flash memory) 120, a network controller 122, and various other controllers (not shown). The processor 114 may include one or more processor cores (not shown) capable of executing a set of stored logic instructions, and an integrated memory controller (IMC) 124 configured to communicate with the system memory 116. The system memory 116 could include, for example, dynamic random access memory (DRAM) configured as a memory module such as a dual inline memory module (DIMM), a small outline DIMM (SODIMM), etc.

The illustrated PCH 118, sometimes referred to as a Southbridge of a chipset, functions as a host device and may communicate with the network controller 122, which could provide off-platform wireless communication functionality for a wide variety of purposes such as, for example, cellular telephone (e.g., W-CDMA (UMTS), CDMA2000 (IS-856/IS-2000), etc.), Wi-Fi (e.g., IEEE 802.11-2007, Wireless Local Area Network/LAN Medium Access Control (MAC) and Physical Layer (PHY) Specifications), Low-Rate Wireless PAN (e.g., IEEE 802.15.4-2006. LR-WPAN), Bluetooth (e.g., IEEE 802.15.1-2005, Wireless Personal Area Networks), WiMax (e.g. IEEE 802.16-2004, LAN/MAN Broadband Wireless LANS), Global Positioning System (GPS), spread spectrum (e.g., 900 MHz), and other radio frequency (RF) telephony purposes. The network controller 122 could also provide off-platform wired communication (e.g., RS-232 (Electronic Industries Alliance/EIA), Ethernet (e.g., IEEE 802.3-2005. LAN/MAN CSMA/CD Access Method), power line communication (e.g., X10. IEEE P1675), USB (e.g., Universal Serial Bus 2.0 Specification), digital subscriber line (DSL), cable modem, T1 connection), etc., functionality.

The illustrated IO interface 110 includes logic 126 to receive rate adjustment commands from the PCH 118, adjust the data rate of the IO interface 110 based on the rate adjustment commands, and adjust the output voltage of a voltage regulator that supplies one or more clock circuits in response to the rate adjustment commands, as already discussed. In particular, the logic 126 may be configured to quickly re-start the IO interface 110 by using either a common clock or an oversampled clock until the clock circuits of the IO interface 110 have had the opportunity to re-lock.

Thus, the techniques described herein may provide the ability for a link at any given generation level to operate across a wide range of data rates. To optimize the power per data rate, the clock circuit power supply can be optimized as a function of data rate using voltage regulators located either on the motherboard or in silicon dedicated to link operation and near the IO connector. Such an approach may yield a V-squared power trade-off with data rate as well as the ability to completely power a link off. In particular, all circuit elements of a link can be powered down (except those that maintain state data), and quickly returned to active status.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. might be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A host platform comprising:
a power supply,
a host device to issue a rate adjustment command,
an input/output (IO) interface including a datapath section having one or more clock circuits coupled to the power supply,
a multiplexer,
an IO controller,
a voltage regulator associated with the one or more clock circuits of the IO interface, and logic to,
   receive the rate adjustment command at the IO interface,
   adjust a data rate of the IO interface in response to the rate adjustment command, and
   adjust an output voltage of the power supply in response to the rate adjustment command,
   wherein the output voltage is adjusted by activating or deactivating the voltage regulator, and wherein upon receipt of a restart command, the voltage regulator is activated by the IO controller and the multiplexer uses a common clock to transfer data from the IO interface until a lock condition is detected.

2. The host platform of claim 1, wherein the rate adjustment command is to include a power down command and the logic is to deactivate the power supply in response to the power down command.

3. The host platform of claim 2, wherein the host device is to issue the re-start command and the logic is to,
   receive the re-start command at the IO interface, and
   activate the power supply in response to the re-start command.

4. The host platform of claim 3, wherein the one or more clock circuits include one or more control loops and the logic is to,
   detect a lock condition of the one or more control loops, and
   increase the data rate of the IO interface in response to the lock condition.

5. The host platform of claim 4, wherein the logic is to use the common clock to transfer data between the host platform and a peripheral device until the lock condition is detected.

6. The host platform of claim 4, wherein the logic is to use an oversampled local clock to transfer data between the host platform and a peripheral device until the lock condition is detected.

7. The host platform of claim 1, wherein the one or more clock circuits include a phase locked loop (PLL) module.

8. The host platform of claim 1, wherein the one or more clock circuits include a clock and data recovery (CDR) module.

9. The host platform of claim 1, wherein the rate adjustment command is to include one or more of an instruction to power down the IO interface or an instruction to restart the IO interface.

10. An input/output (IO) interface comprising:
a datapath section including one or more clock circuits,
a multiplexer,
a power supply coupled to the one or more clock circuits, and
logic to,
   receive a rate adjustment command at the IO interface,
   adjust a data rate of the IO interface in response to the rate adjustment command, and
   adjust an output voltage of the power supply in response to the rate adjustment command,
   wherein the output voltage is adjusted by activating or deactivating a voltage regulator associated with the one or more clock circuits of the IO interface, and wherein, upon receipt of a restart command, the voltage regulator is activated based on receipt of a restart command and the multiplexer uses a common clock to transfer data from the IO interface until a lock condition is detected.

11. The IO interface of claim 10, wherein the rate adjustment command is to include a power down command and the logic is to deactivate the power supply in response to the power down command.

12. The IO interface of claim 11, wherein the logic is to,
   receive the re-start command at the IO interface, and
   activate the power supply in response to the re-start command.

13. The IO interface of claim 12, wherein the one or more clock circuits include one or more control loops and the logic is to,
   detect a lock condition of the one or more control loops, and
   increase the data rate of the IO interface in response to the lock condition.

14. The IO interface of claim 13, wherein the logic is to use the common clock to transfer data between a host platform and a peripheral device until the lock condition is detected.

15. The IO interface of claim 13, wherein the logic is to use an oversampled local clock to transfer data between a host platform and a peripheral device until the lock condition is detected.

16. The IO interface of claim 10, wherein the one or more clock circuits include a phase locked loop (PLL) module.

17. The IO interface of claim 10, wherein the one or more clock circuits include a clock and data recovery (CDR) module.

18. The IO interface of claim 10, wherein the rate adjustment command is to include one or more of an instruction to power down the IO interface or an instruction to restart the IO interface.

19. A computer implemented method comprising:
receiving a rate adjustment command from a host device at an input/output (IO) interface;
adjusting a data rate of the IO interface in response to the rate adjustment command; and
adjusting an output voltage of a power supply associated with one or more clock circuits of the IO interface in response to the rate adjustment command;
wherein the output voltage is adjusted by activating or deactivating a voltage regulator associated with one or more clock circuits of the IO interface, and wherein, upon receipt of a restart command, the voltage regulator is activated and a common clock is used to transfer data from the IO interface until a lock condition is detected.

20. The method of claim 19, wherein the rate adjustment command includes a power down command and adjusting the output voltage includes deactivating the power supply associated with the one or more clock circuits in response to the power down command.

21. The method of claim 20, further including:
receiving the re-start command at the IO interface; and
activating the power supply in response to the re-start command.

22. The method of claim 21, further including:
detecting a lock condition of one or more control loops of the one or more clock circuits; and
increasing the data rate of the IO interface in response to the lock condition.

23. The method of claim 22, further including using the common clock to transfer data between a host platform and a peripheral device until the lock condition is detected.

24. The method of claim 22, further including using an oversampled local clock to transfer data between a host platform and a peripheral device until the lock condition is detected.

25. The method of claim 19, wherein the output voltage of a power supply associated with at least one of a phase locked loop (PLL) module and a clock and data recovery (CDR) module is adjusted in response to the rate adjustment command.

26. The method of claim 19, wherein the rate adjustment command includes one or more of an instruction to power down the IO interface or an instruction to restart the IO interface.

27. A non-transitory computer readable storage medium comprising a set of instructions which, if executed by a processor, cause an input/output (IO) interface to:
receive a rate adjustment command from a host device at the IO interface;
adjust a data rate of the IO interface in response to the rate adjustment command; and
adjust an output voltage of a power supply associated with one or more clock circuits of the IO interface in response to the rate adjustment commands;
wherein the output voltage is adjusted by activating or deactivating a voltage regulator associated with one or more clock circuits of the IO interface, and wherein, upon receipt of a restart command, the voltage regulator is activated and a common clock is used to transfer data from the IO interface until a lock condition is detected.

28. The medium of claim 27, wherein the rate adjustment command is to include a power down command and the instructions, if executed, cause the IO interface to deactivate the power supply associated with the one or more clock circuits in response to the power down command.

29. The medium of claim 28, wherein the instructions, if executed, cause the IO interface to:
receive the re-start command at the IO interface; and
activate the power supply in response to the re-start command.

30. The medium of claim 29, wherein the instructions, if executed, cause the IO interface to:
detect a lock condition of one or more control loops of the one or more clock circuits; and
increase the data rate of the IO interface in response to the lock condition.

31. The medium of claim 30, wherein the instructions, if executed, cause the IO interface to use the common clock to transfer data between a host platform and a peripheral device until the lock condition is detected.

32. The medium of claim 30, wherein the instructions, if executed, cause the IO interface to use an oversampled local clock to transfer data between a host platform and a peripheral device until the lock condition is detected.

33. The medium of claim 27, wherein the output voltage of a power supply associated with at least one of a phase locked loop (PLL) module and a clock and data recovery (CDR) module is adjusted in response to the rate adjustment command.

34. The medium of claim 27, wherein the rate adjustment command is to include one or more of an instruction to power down the IO interface or an instruction to restart the IO interface.

* * * * *

UNITED STATES PATENT AND TRADEMARK OFFICE
CERTIFICATE OF CORRECTION

PATENT NO. : 9,791,905 B2  
APPLICATION NO. : 13/995596  
DATED : October 17, 2017  
INVENTOR(S) : Stephen R. Mooney et al.

Page 1 of 1

It is certified that error appears in the above-identified patent and that said Letters Patent is hereby corrected as shown below:

In Column 10, Line number 14, in Claim 27, replace "commands" with -- command --

Signed and Sealed this
Thirteenth Day of February, 2018

Andrei Iancu
*Director of the United States Patent and Trademark Office*